Figure 1:
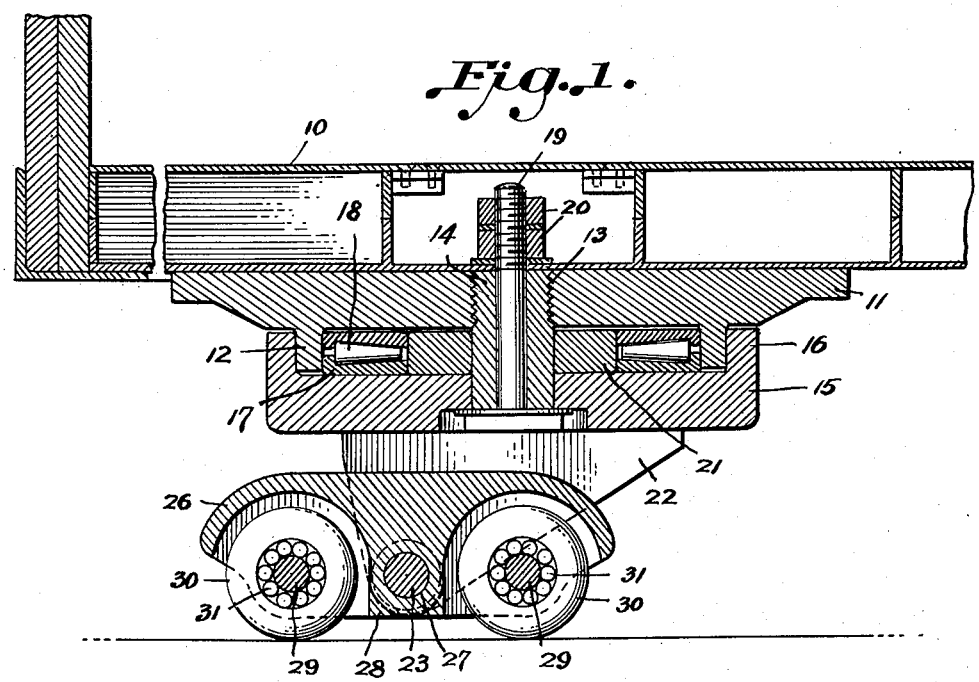

Sept. 29, 1959      F. R. HULL      2,905,964

CASTER STRUCTURE

Filed Feb. 27, 1957

Francis R. Hull,
INVENTOR.

BY *Dwight R. Barr*

ATTY.

United States Patent Office 2,905,964
Patented Sept. 29, 1959

2,905,964

CASTER STRUCTURE

Francis R. Hull, Macungie, Pa.

Application February 27, 1957, Serial No. 642,813

2 Claims. (Cl. 16—20)

This invention is a caster structure particularly adapted for the support of relatively large containers for the accommodation of heavy, unwieldy merchandise.

The primary object of the invention is to provide a caster structure of relatively simple construction adapted for heavy duty, which has its comparatively few simple and readily assembled parts so constructed and associated with one another as to sustain heavy weights to which they will be subjected and to equally distribute such weights throughout the several parts of the assembly.

A further object of the invention is to provide a caster structure of the character and for the purposes generally stated which may be manufactured by simple comparatively inexpensive processes, characterized by such structure and arrangement as to enable the same to be properly assembled expeditiously and without the exercise of special skill or training.

A still further object of the invention is to provide a caster structure involving spaced parallel supporting rollers or wheels mounted in tandem and in such manner as to permit rocking motion within desirable limits to enable the caster to readily adapt itself to uneven surfaces and at the same time to properly and adequately sustain the weights and stresses to which it will be subjected.

A further object of the invention is to provide a caster structure wherein the supporting rollers in tandem are rockably mounted upon an axis out of alignment with the rotational pivotal support of the caster whereby to permit of the supporting rollers readily adapting themselves to unevenness in floor or other supporting surfaces and to enable the caster to readily ride over obstructions or undulations which may lie in the path of the caster when being rolled.

With these objects in view, together with others which will appear as the description proceeds, the invention consists in the novel construction, combination and arrangement of parts, all as will be described more fully hereinafter, illustrated in the drawing, and particularly pointed out in the claims.

Figure 2:
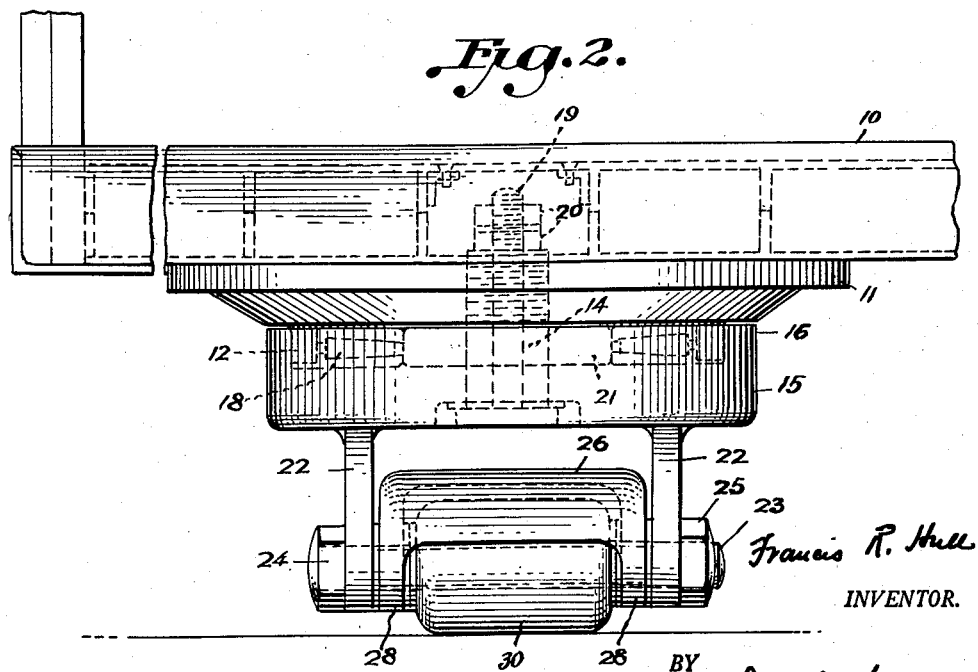

In the drawings:

Fig. 1 is a vertical cross sectional view through a caster constructed in accordance with the invention, and Fig. 2 is a front elevation of the caster structure as shown in Fig. 1.

The caster structure of this invention is developed for heavy duty, that is for the adequate support and ready transportation of heavy loads such as are encountered in warehousing operations or aboard cars or ships where heavy machinery and other merchandise must be moved from place to place either in loading or unloading operations or in stowage.

The caster of my invention is shown as applied to the underside of the floor of a suitable container, which floor is represented generally at 10 and may take any desired form or construction. It will be understood that casters involving the invention may be applied to the underside of the carriage at any desired points and any required numbers. The structure embodies a base plate of suitable metal indicated at 11 and which in the present instance is of circular formation, having a depending flange 12 spaced inwardly from the outer edges of the plate. The center of the plate is bored and this bore is threaded as indicated at 13 to receive coreresponding threads of a sleeve 14.

Associated with this base plate is a caster head indicated at 15, formed of suitable metal, centrally bored as shown, of circular formation and having an upstanding annular flange or rim 16 at its outer edge to embrace the flange 12 depending from the base plate 11. Interposed between the caster head 15 and the base plate 11 are cooperating bearing rings 17 between which roller bearings 18 are interposed. The said bearings sustaining the weight of the container and in the manner stated permitting the caster head 15 to have free rotative movement upon the sleeve 14 which passes centrally through the said caster head. The sleeve 14 is firmly secured to the body of the container 10 by the pin 19 which passes centrally therethrough and is headed at one end upon the caster head, having lock nuts 20 secured to its upper end in order to effectively secure the entire structure to the base portion 10 of the container. An adapter ring 21 encircles the sleeve 14 and is interposed between the base plate and the caster head as will be understood.

The caster head 15 has integrally formed therewith spaced parallel depending fork plates 22, the said plates being provided near their lower ends with transverse openings to receive a fork bolt 23. This bolt has a head 24 at one end and a securing nut 25 at the opposite end whereby the said bolt may be securely attached to the fork plates which it connects. It will be observed that the fork bolt is disposed in an axis transverse to the axis of the securing bolt 19 and out of alignment with the latter.

Interposed between the fork plates 22 is a housing 26 formed of suitable rigid metal and having an opening 27 midway its ends to be rockably mounted near its sides upon the fork bolt 23. This housing is provided near its ends and equi-distant from the fork axle or bolt 23 with bearings 28 for the support of axles 29 to receive supporting rollers 30. In the drawing, these rollers are mounted upon the axles 29 by either roller or ball bearings 31.

From this construction it is apparent that the base plate and caster head may easily and quickly be assembled in rotative relationship with respect to one another by the sleeve 14 and the pivot bolt 19, being at the same time firmly mounted upon the underside of the floor or bottom of the container which the caster is to support. From the structure described and illustrated, it is apparent that the caster head will be free to rotate upon the rigidly mounted base plate 11. The specific mounting of the rollers 30 in their housing 26 in tandem insures equal distribution of the strains and pressures to which the caster structure will be subjected. By rockably mounting the tandem casters, it is apparent that notwithstanding excessive loads to which the caster will be subjected, the casters will adapt themselves in movement over a floor or supporting base which may be undulating or possessed of obstructions. By offsetting the fork pin 23 from the vertical axis of the caster head, the lead roller of the tandem casters may more readily mount and pass over an abrupt obstruction, as well as to enable the tandem roller structure to adapt itself to undulations present in a supporting surface.

I claim:

1. In a caster structure, a base plate, an annular flange depending from said plate, a caster head disposed beneath said plate, an upstanding circular rim at the outer edges of said head enclosing and engaging said flange, an annular bearing race seated on said head within said rim and engaging the latter, a separable and centrally bored adapter ring fitted within said bearing race, a sleeve seated at one end in said head and extending through the bore of said ring and through said plate, means to secure said sleeve to said plate, and rollers mounted on the underside of said head to support the same.

2. In a caster structure, a base plate having a central aperture therein, an annular flange depending from said plate concentric with said aperture and spaced inwardly from the edges of the plate, a caster head disposed beneath said plate, an upstanding circular rim at the outer edges of said head engaging the exterior surfaces of said flange, an annular bearing race seated on said head within said rim and engaging the latter, a centrally bored adapter ring fitted within said bearing race and having a central opening corresponding with that of said plate and concentric therewith, a sleeve seated at one end in said head and extending through the opening of said ring as well as through the opening of said plate, a bolt extending through said sleeve and nuts on the end of said bolt to secure the same to a body, and rollers mounted on the underside of said head to support the same.

References Cited in the file of this patent

UNITED STATES PATENTS

| | | |
|---|---|---|
| 630,696 | Higgins et al. | Aug. 8, 1899 |
| 785,601 | Fischer | Mar. 21, 1905 |
| 791,915 | Kade | June 6, 1905 |
| 1,012,228 | De Vlaming | Dec. 19, 1911 |
| 1,345,622 | Nack | July 6, 1920 |
| 1,383,774 | Smithfield | July 5, 1921 |
| 1,711,723 | Cousins | May 7, 1929 |

FOREIGN PATENTS

| | | |
|---|---|---|
| 18,041 | Great Britain | 1892 |